United States Patent

Lucas

[15] 3,667,625

[45] June 6, 1972

[54] DUNNAGE DEVICE

[72] Inventor: George A. Lucas, Rockmart, Ga.

[73] Assignee: The Goodyear Tire & Rubber Company, Akron, Ohio

[22] Filed: Aug. 5, 1970

[21] Appl. No.: 61,161

[52] U.S. Cl. ................................214/10.5 D, 105/369 BA
[51] Int. Cl. ............................................................B65g 1/14
[58] Field of Search ............214/10.5 D; 105/369 BA; 5/348; 206/DIG. 30

[56] References Cited

UNITED STATES PATENTS

| | | |
|---|---|---|
| 1,976,793 | 10/1934 | Mangold................................5/348 X |
| 3,554,135 | 1/1971 | Duvall et al....................214/10.5 D X |
| 3,008,214 | 11/1961 | Foster et al. ............................5/348 X |

FOREIGN PATENTS OR APPLICATIONS 1,128,764   10/1968   Great Britain..............................5/348

Primary Examiner—Gerald M. Forlenza
Assistant Examiner—Frank E. Werner
Attorney—F. W. Brunner and Ronald P. Yaist

[57] ABSTRACT

An inflatable, bladderless dunnage device of economical construction for shoring merchandise in a storage compartment. The member includes a unitary body and valve means connected therewith. The body is formed of a laminate of pressure-retaining, flexible material including a layer or sheet of flexible polymeric material and a layer of open mesh textile fabric covering at least substantially the entire outer surface of the polymeric material layer. The polymeric material fills the openings or interstices of the fabric layer to form a bond therewith capable of withstanding at least low to intermediate pressure when the member is inflated. Preferably the polymeric material is at least substantially air impervious and the textile fabric layer is preferably of a leno weave construction.

13 Claims, 4 Drawing Figures

PATENTED JUN 6 1972 3,667,625

INVENTOR.
GEORGE A. LUCAS
BY
Ronald P. Yaist
ATTORNEY

DUNNAGE DEVICE

BACKGROUND OF THE INVENTION

This invention relates to inflatable members of flexible material for shoring merchandise in a storage compartment. More specifically, this invention relates to an improved low-cost inflatable dunnage device capable of withstanding low to intermediate pressures during service.

Pneumatic dunnage devices commonly referred to as dunnage bags, are typically used in place of conventional wooden shoring and bracing in the cargo compartments of transport vehicles such as railroad box cars, trucks, tractors and ships in which they are used to shore various types of cargo. According to present day practices, dunnage bags are normally composed of plies of air-impervious, pressure-retaining material such as closely formed textile fabric material, either square-woven or in cord form, which has been impregnated with natural or synthetic rubber or other rubber-like materials. Any of the ordinary types of textile fabric materials commonly used to provide strength, such as cotton, nylon, rayon or polyester, are suitable for this purpose. The dunnage bag may or may not include an inner bladder of flexible stretchable material which is encased in a cover of rubberized fabric material. The bags also are equipped with a valve for receiving air or other inflation media under pressure so that the bag may be conveniently inflated and deflated.

These flexible dunnage members are generally constructed of relatively expensive, high-quality abrasion-resistant materials capable of withstanding high pressures during service. However, for some light-duty applications in which only relatively low or intermediate pressures are required, these expensive dunnage devices are not appropriate because of obvious economic considerations. Consequently, many so-called disposable dunnage devices have been employed which consist of an inflatable bladder contained within an outer casing or cover of material such as paper or cardboard. Examples of these constructions are disclosed in Polby U.S. Pat. No. 3,072,270 and Feldkamp U.S. Pat. No. 3,199,689. In addition, Marks U.S. Pat. No. 3,426,891 describes a low-cost dunnage device in which an inflatable bladder is provided with a cover having a close knitted material structure composed of paper or plastic strands.

These prior art devices, however, have not proven to be completely satisfactory due primarily to their lack of durability and low puncture resistance, for example, when the bag comes into contact with sharp objects in the storage compartment. Furthermore, since the prior art devices are of a separate two-component construction including an inner inflatable ladder and an outer covering, the likelihood of damage or fluid leakage is increased and repairs are made difficult since either one or both of the components may be damaged during service. Other additional well-known disadvantages of the bladder-type dunnage device include both increased cost and weight.

These disadvantages, as previously discussed, are overcome by the use of the inflatable dunnage devices of the present invention as will be hereinafter described.

OBJECTS OF THE INVENTION

It is an object of the present invention to provide an inflatable member which may be economically used as a dunnage device of improved durability for protecting merchandise in the cargo compartment of a transport vehicle where only low or intermediate pressures are required.

It is another object of this invention to provide an inflatable bladderless dunnage device for light-duty applications which is formed of a low cost, unitary, puncture-resistant construction.

Other objects and advantages of this invention will become apparent hereinafter as the description thereof proceeds, the novel features, arrangements and combinations being clearly pointed out in the specification as well as the claims thereunto appended.

It has been found that these foregoing objects are accomplished in accordance with the present invention by providing an inflatable member for use as a dunnage device comprising a unitary body formed of a laminate of pressure-retaining, flexible material including a layer or sheet of flexible polymeric material and a layer of open mesh textile fabric covering at least substantially the entire outer surface of the flexible polymeric layer. The polymeric material fills the interstices of the fabric layer to form a bond therewith capable of withstanding at least low to intermediate pressures when the member is inflated. The member also includes valve means operably connected with the body for inflating and deflating the member.

The textile fabric layer is preferably in the form of a fabric cloth of a straight or reverse leno weave construction. The flexible polymeric material is preferably composed of at least one substantially fluid-impervious elastomer and the textile fabric material is at least one material selected from the group consisting of cotton, nylon, rayon or polyester. In the preferred form of the invention, the flexible polymeric material is a butyl elastomer and the textile fabric material is nylon.

DESCRIPTION OF THE PREFERRED EMBODIMENTS

Figure 1:
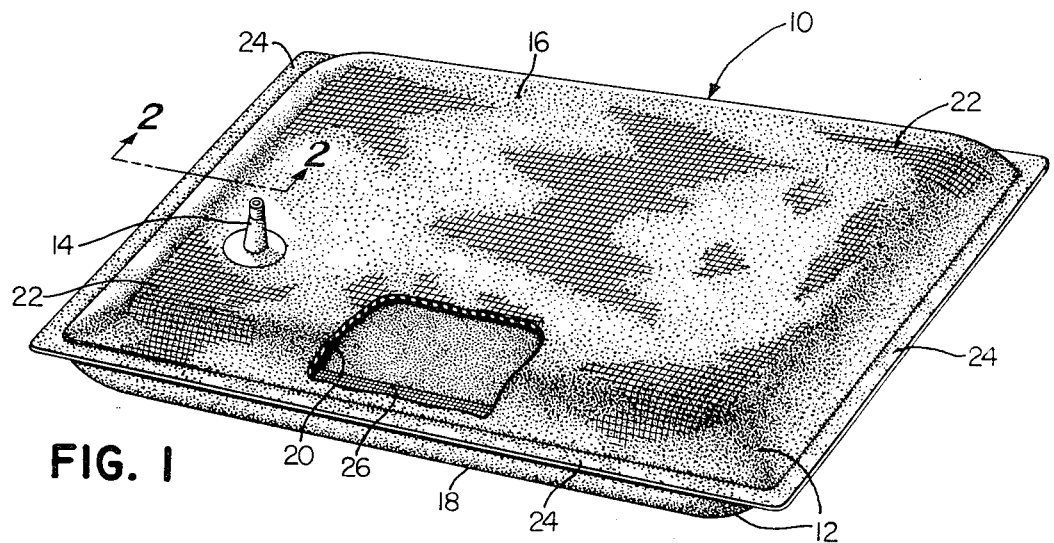
FIG. 1 is a perspective view of the inflatable member of this invention with parts broken away to more clearly show the invention.

In FIG. 1, the bladderless, inflatable dunnage device or bag 10 of this invention of the type used to shore merchandise in a cargo compartment of a transport vehicle is shown in its inflated condition. In this instance, the device 10 includes an inflatable unitary body 12 of flexible material and a valve 14 connected with the body 12 in order that the bag may be inflated by an appropriate inflating medium such as air under pressure, and subsequently deflated after service. The valve 14 may be of any of the conventional type constructions well known in the art and its particular construction plays no part in the present invention.

The body 12 is formed of a laminate of pressure-retaining flexible material including opposed sheets or plies 16 and 18 which include a layer or sheet 20 of flexible polymeric material and a cloth layer 22 of open mesh textile fabric covering at least substantially the entire outer surface of the sheet 20. The polymeric material of the sheet 20 is preferably vulcanizable and fills the openings or interstices of the fabric or cloth layer 22 during vulcanization to form a bond therewith capable of withstanding low to intermediate pressures, for example in the range of at least 1 psi, when the dunnage bag 10 is inflated. It also is significant that the outer surface of the bag 10, because of the "strike through" condition caused by this flow of materials, has a roughened, exposed wear-resistant surface which contacts the cargo or merchandise. Consequently, a longer-wearing dunnage device is produced.

A sealed edge or pinch seam 24 is formed around the body 12 of the bag 10 by joining the plies 16 and 18 along their peripheral edges. The seam 24 may extend around the entire periphery of the bag 10 as shown in FIG. 1 or may have only portions of its margins sealed, such as for example its end portions.

Figure 2:
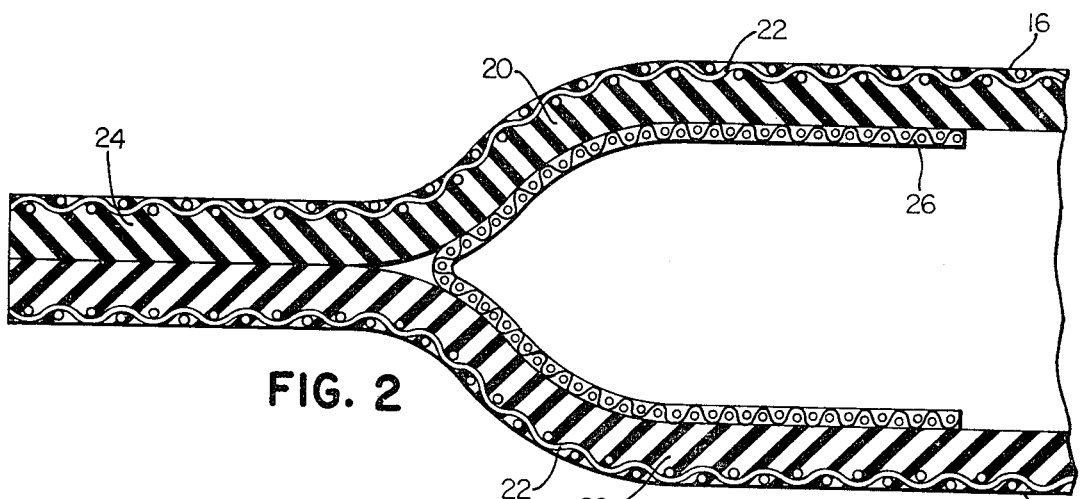
FIG. 2 is an enlarged section taken on line 2—2 of FIG. 1.

As shown in FIG. 2, an elongated tape or strip 26, for example of rubber-coated or impregnated fabric such as open mesh fabric, square-woven fabric or tire cord fabric, having a generally V-shaped configuration, commonly known as a "crotch strip", may be provided for additional strength. The strip 26 may be composed of any of the well-known textile fabrics such as cotton, nylon, rayon or polyester, or combinations thereof. The strip 26, for example, may extend substantially around the entire inner periphery of the bag 10 and be adhered thereto by means of a suitable adhesive prior to vulcanization. The strip 26 fits into the crotch-like contour formed by the body 12 immediately adjacent the pinch seam 24 of the sealed outer edges of the bag 10 and provides the necessary reinforcement for the bag 10 in the area of the seam 24 to guard against leaks and insure the proper retention of pressure. The strip 26 may be one continuous elongated piece or may be made up of several segments spliced together end to end. When the strip 26 is employed, the dunnage device 10 is capable of withstanding increased pressures during inflation, for example up to 4 psi.

The sheet 20 of flexible polymeric material is preferably composed of a butyl elastomer because of its relatively low cost and excellent fluid retention properties but any one of the other well-known substantially fluid-impervious elastomers such as neoprene or acrylonitrile, or blends or combinations thereof, may also be used satisfactorily for this purpose. In addition, other flexible polymeric materials, such as natural or synthetic rubber or rubber-like materials such as polyvinyl chloride or polyurethane, although perhaps less desirable, may also be used to form the layer 20. It has been found that a butyl elastomeric sheet having a thickness of from about 0.050 to about 0.060 provides a very acceptable structure when combined with the fabric layer 22 to form a unitary construction for the body 12.

The fabric layer 22 can be of any type open mesh construction such as open weave or open knit, but preferably is of a leno weave construction composed of perpendicularly interlaced warp and filling yarns in which selected adjacent warp yarns interweave alternately to the right and left of adjacent ends. This construction has the advantage over other open type, plain woven fabrics of providing adequate strength and stability during processing at a minimum expense. This type open weave fabric construction is described in Wellington Sears Handbook of Industrial Textiles (1936) by Ernest R Kosewell on pages 196 and 197.

Figure 3:
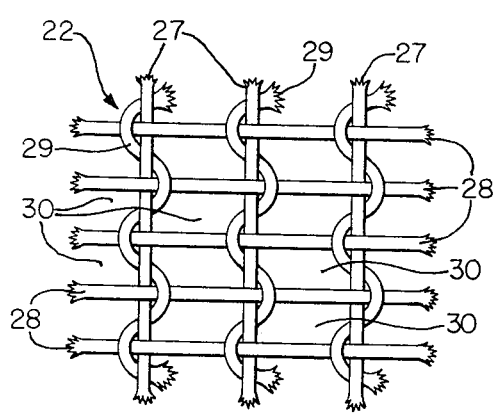
FIGS. 3 and 4 are enlarged fragmentary plan views of the preferred textile fabric material of the invention.
Figure 4:
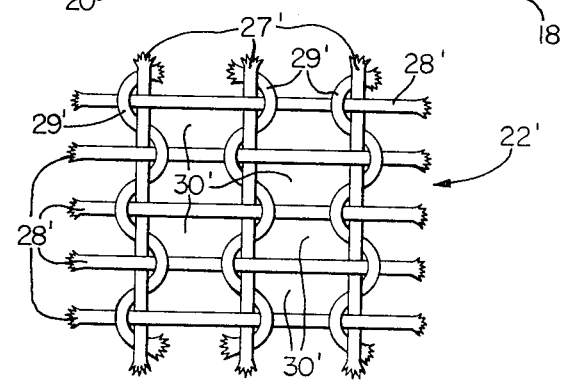

The fabric layer 22 and 22' may be of a straight leno weave construction as shown in FIG. 3 or a reverse leno weave construction as shown in FIG. 4. As illustrated in the leno weave construction, the perpendicular warp yarns or threads 27 and 27' and filling yarns 28 and 28' interlace and, in addition, the adjacent warp yarns 29 and 29' interweave alternately to the right and left of the adjacent ends or warp yarns 27 and 27'. The openings or interstices 30 and 30' thus created in the layer 22 and 22' respectively are filled with the polymeric or elastomeric material of the sheet 20 thereby forming a bond as previously described.

It has been found, for example, that a single layer of nylon straight leno weave fabric cloth having a weight of about 4.20 ounces per square yard with a warp construction of 840/1 denier, 18 ends per inch and a filling construction of 1050/1 denier, 13 picks per inch with a gauge of about 0.020 inches will provide adequate strength in the low to intermediate pressure ranges. Of course, the fabric cloth layer 22 may also be composed of other fabric material such as cotton, rayon or polyester or combinations thereof.

It is to be understood that any of the standard building and vulcanizing procedures common in the art may be used in manufacturing the dunnage devices of this invention. The particular method used will be largely determined by the customary practices of the particular manufacturer. In addition, the methods and equipment used may vary depending on the type of open fabric construction used.

In the preferred method of manufacturing the dunnage device 10, the various components are joined together in an unvulcanized state and subsequently vulcanized to form a composite structure. For example, in manufacturing the laminated sheets or plies 16 and 18 of the dunnage device 10, the fabric or cloth layer 22 is cut to the desired size preferably subsequent to being dipped in a suitable adhesive solution. The polymeric sheet or layer 20 is then applied by hand laminating, or calendering, or some other appropriate procedure conventionally used for this purpose. For example, an unvulcanized layer of butyl rubber of the desired thickness may be applied to the fabric or cloth layer 22. The laminated sheets 16 and 18 are then joined along their entire outer peripheral edges with a suitable adhesive to form the sealed edges or pinch seam 24 with the fabric layer 22 covering the entire outer surface of the butyl layer 20. For added strength, a butyl rubber impregnated cotton fabric strip 26 of generally V-shaped configuration may be adhered to the interior periphery of the device 10 by means of a suitable adhesive. Upon vulcanization, the butyl elastomer flows into and fills the openings or interstices 30 of the nylon fabric layer 22 to thereby provide a completely pressure-retaining, inflatable dunnage member having a body 12 of unitary construction with a wear-resistant outer surface. The valve 14 is attached to the body 12 in a conventional manner and is designed to be used with standard inflating devices.

Those skilled in the art will appreciate that the inflatable members of the present invention satisfy a long-felt need by providing an economical dunnage device of improved durability having a puncture-resistant construction capable of withstanding at least low to intermediate inflation pressures when used to shore merchandise in various storage facilities. Furthermore, since the device is of a bladderless construction, the problems inherent with the use of a two-component structure having an inner inflatable bladder and a separate outer cover or casing are eliminated.

While certain representative embodiments and details have been shown for the purpose of illustrating the invention, it will be apparent to those skilled in the art that various changes and modifications may be made therein without departing from the spirit or scope of the invention.

What is claimed is:

1. An inflatable member comprising a unitary body formed of a laminate of pressure-retaining, flexible material including a layer of flexible polymeric material which comprises the major portion of said laminate and a layer of open mesh textile fabric material disposed in substantially a coplanar relationship with the outer surface of said layer of polymeric material and covering at least substantially the entire outer surface thereof with the polymeric material filling and extending through the interstices of the fabric layer to form a bond therewith capable of withstanding at least low to intermediate pressures when said member is inflated to control the expansion of the layer of polymeric material, and valve means operably connected with said body for inflating and deflating said member.

2. The member as claimed in claim 1 wherein the fabric layer is of a straight leno weave construction.

3. The member as claimed in claim 1 wherein the fabric layer is of a reverse leno weave construction.

4. The member as claimed in claim 1 wherein said body is formed of opposed plies of said pressure retaining material with at least a portion of the peripheral outer edges thereof sealed to form a pressure-tight seam.

5. The member as claimed in claim 4 wherein said body further includes a strip of flexible material extending substantially around the entire interior periphery of the inflatable member and fitting into the crotch-like contour formed by said body adjacent said sealed outer edges thereof to provide reinforcement therefor with said member thereby capable of withstanding increased pressure during inflation.

6. The member as claimed in claim 1 wherein said layer of flexible polymeric material is composed of at least one substantially fluid-impervious elastomer and said textile fabric layer is composed of at least one material selected from the group consisting of cotton, nylon, rayon or polyester.

7. The member as claimed in claim 6 wherein the flexible polymeric material is a butyl elastomer and the textile fabric material is nylon.

8. An inflatable dunnage device for shoring merchandise in a storage compartment, said device comprising:

A. an inflatable body of unitary construction formed of opposed laminated plies of pressure-retaining flexible material with at least a portion of the peripheral outer edges thereof sealed to form a pressure-tight seam, each said ply including:
1. a sheet of flexible fluid impervious polymeric material which comprises the major portion of said body, and
2. a cloth layer of open weave textile fabric material disposed in substantially a coplanar relationship with the outer surface of said sheet of polymeric material and covering the entire outer surface of said sheet with the polymeric material filling and extending through the interstices of the cloth layer to form a bond therewith capable of withstanding a pressure of at least 1 psi when said device is inflated to control the expansion of the polymeric material; and B. valve means operably connected with said body for inflating and deflating said device.

9. The device as claimed in claim 8 wherein the cloth layer is of a straight leno weave construction.

10. The device as claimed in claim 8 wherein the cloth layer is of a reverse leno weave construction.

11. The device as claimed in claim 8 wherein said seam is formed around the entire peripheral outer edges thereof and a generally V-shaped strip of flexible fabric material extends substantially around the entire interior periphery of the inflatable device fitting into the crotch-like contour formed by said body adjacent said sealed outer edges thereof to provide reinforcement therefor with said device thereby capable of withstanding pressures of up to about 4 psi during inflation.

12. The device as claimed in Claim 8 wherein said flexible polymeric material is at least one elastomer selected from the group consisting of butyl, neoprene and acrylonitrile rubber and said textile fabric material is at least one material selected from the group consisting of cotton, nylon, rayon or polyester.

13. The device as claimed in Claim 12 wherein said flexible polymeric material is a butyl elastomer and said textile fabric material is nylon.

* * * * *

PO-1050
(5/69)

UNITED STATES PATENT OFFICE
CERTIFICATE OF CORRECTION

Patent No. 3,667,625          Dated June 6, 1972

Inventor(s) George A Lucas

It is certified that error appears in the above-identified patent and that said Letters Patent are hereby corrected as shown below:

Column 3, line 43, change "interlace" to --intersect--.

Signed and sealed this 23rd day of April 1974.

(SEAL)
Attest:

EDWARD M.FLETCHER,JR.
Attesting Officer

C. MARSHALL DANN
Commissioner of Patents